(12) United States Patent
Tomita

(10) Patent No.: US 11,334,350 B2
(45) Date of Patent: May 17, 2022

(54) PROGRAM COMPONENT EVALUATION SYSTEM AND PROGRAM COMPONENT EVALUATION METHOD

(71) Applicant: Hitachi, Ltd., Tokyo (JP)

(72) Inventor: Taminori Tomita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/241,723

(22) Filed: Apr. 27, 2021

(65) Prior Publication Data

US 2021/0334097 A1    Oct. 28, 2021

(30) Foreign Application Priority Data

Apr. 28, 2020   (JP) .............................. JP2020-078943

(51) Int. Cl.
| | |
|---|---|
| *G06F 9/44* | (2018.01) |
| *G06F 8/75* | (2018.01) |
| *G06F 11/34* | (2006.01) |
| *G06F 8/73* | (2018.01) |

(52) U.S. Cl.
CPC .................. *G06F 8/75* (2013.01); *G06F 8/73* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 6,456,738 B1 * | 9/2002 | Tsukasa ............. | G06K 9/00442 715/251 |
| 2018/0032605 A1 * | 2/2018 | Deshpande ........... | G06F 16/338 |
| 2019/0087384 A1 * | 3/2019 | Goto .................... | G06K 9/6239 |
| 2020/0247138 A1 * | 8/2020 | Furukawa ............. | B41J 2/2121 |

FOREIGN PATENT DOCUMENTS

JP         2015-75876 A         4/2015

\* cited by examiner

*Primary Examiner* — Qamrun Nahar
(74) *Attorney, Agent, or Firm* — Crowell & Moring LLP

(57) ABSTRACT

An object of the present invention is to efficiently advance development of a program by appropriately evaluating a program component. A program component evaluation system stores a data model that is information including a data type and data characteristics required for each input data of plural program components used for configuring software, extracts the data model conforming to the data type of target input data that is data to be determined regarding whether or not the data can be used as the input data of the program component, analyzes whether or not the target input data conforms to each of the data characteristics for each of the extracted data models, specifies the program component in which the target input data conforms to the data characteristics of the data model of the input data, and outputs information indicating the specified program component.

13 Claims, 12 Drawing Sheets

INPUT/OUTPUT MANAGEMENT TABLE 31

| PROGRAM COMPONENT ID | INPUT DATA MODEL ID | OUTPUT DATA MODEL ID |
|---|---|---|
| PG1 | DM1 | DM2 |
| PG2 | DM2 | DM3 |
| PG3 | DM4 | DM5 |
| PG4 | DM6 | DM7 |
| ⋮ | ⋮ | ⋮ |
| PGn | DMn-1 | DMn |

FIG. 4

DATA MODEL MANAGEMENT TABLE 41

| DATA MODEL ID | DATA TYPE | DATA CHARACTERISTIC | | |
|---|---|---|---|---|
| DM1 | INT[a] INTEGER ARRAY | a=100 | RANGE 0<=A.VALUE<=100 | MEAN VALUE<50 |
| DM2 | INT[a] INTEGER ARRAY | a=100 | RANGE 0<=A.VALUE<=100 | VARIANCE<10 |
| DM3 | STRING CHARACTER STRING | LENGTH<256 | - | - |
| DM4 | STRING CHARACTER STRING | 8<=LENGTH, | ALPHAMERIC CHARACTER | - |
| DM5 | DOUBLE[a, b] TWO-DIMENSIONAL ARRAY | 0<a<100, 0<b<100 | RANGE 0<=A.VALUE | - |
| DM6 | DOUBLE[a, b] TWO-DIMENSIONAL ARRAY | a=b (SQUARE MATRIX) | - | - |
| DM7 | DOUBLE[a, b] TWO-DIMENSIONAL ARRAY | a=b (SQUARE MATRIX) | DIAGONAL MATRIX | - |
| DM8 | INT INTEGER | - | RANGE 0<VALUE<100 | - |
| DM9 | DOUBLE | - | RANGE 0<=VALUE<60 | - |
| DM10 | DOUBLE | - | RANGE 60<=VALUE<120 | - |

OPERATION LOG TABLE 51

| LOG ID | DATE AND TIME | PROGRAM COMPONENT ID | INPUT DATA | OUTPUT DATA |
|---|---|---|---|---|
| 001 | 2020/02/27 13:00:00 | PG2 | DATA OF DM2 | DATA OF DM3 |
| 002 | 2020/02/27 14:25:00 | PG3 | DATA OF DM4 | DATA OF DM5 |
| 003 | 2020/02/27 15:30:00 | PG4 | DATA OF DM6 | DATA OF DM7 |
| 004 | 2020/02/27 16:40:00 | PG1 | DATA OF DM1 | DATA OF DM2 |
| 005 | 2020/02/27 17:50:00 | PG5 | DATA OF DM8 | DATA OF DM9 |
| 006 | 2020/02/27 18:55:00 | PG6 | DATA OF DM9 | DATA OF DM10 |

ANALYSIS RESULT TABLE 71

| DATE AND TIME | LOG ID | DATA MODEL ID | ANALYSIS RESULT | |
|---|---|---|---|---|
| 2020/02/27 13:00:00 | 001 | DM3 | THE NUMBER OF CHARACTERS: 16: PASS | — |
| | | DM4 | THE NUMBER OF CHARACTERS: 16: PASS | ALPHAMERIC CHARACTER: PASS |
| 2020/02/27 14:25:00 | 002 | DM5 | DATA RANGE: 0 TO 10: PASS | — |
| | | DM6 | SQUARE MATRIX: PASS | — |
| | | DM7 | SQUARE MATRIX: PASS DIAGONAL MATRIX: PASS | — |
| 2020/02/27 15:30:00 | 003 | DM7 | SQUARE MATRIX: PASS DIAGONAL MATRIX: FAIL | — |
| | | DM5 | DATA RANGE: −1 TO 1: FAIL | — |
| | | DM6 | SQUARE MATRIX: PASS | — |
| 2020/02/27 16:40:00 | 004 | DM2 | DATA RANGE: 31 TO 89: PASS | VARIANCE 6.7: PASS |
| | | DM1 | DATA RANGE: 31 TO 89: PASS | MEAN VALUE: 62: FAIL |
| 2020/02/27 17:50:00 | 005 | DM9 | DATA RANGE: 25 TO 45: PASS | — |
| | | DM10 | DATA RANGE: 25 TO 45: FAIL | — |
| 2020/02/27 18:55:00 | 006 | DM10 | DATA RANGE: 61 TO 99: PASS | — |
| | | DM9 | DATA RANGE: 61 TO 99: FAIL | — |

Columns: 711 DATE AND TIME, 712 LOG ID, 713 DATA MODEL ID, 714 ANALYSIS RESULT

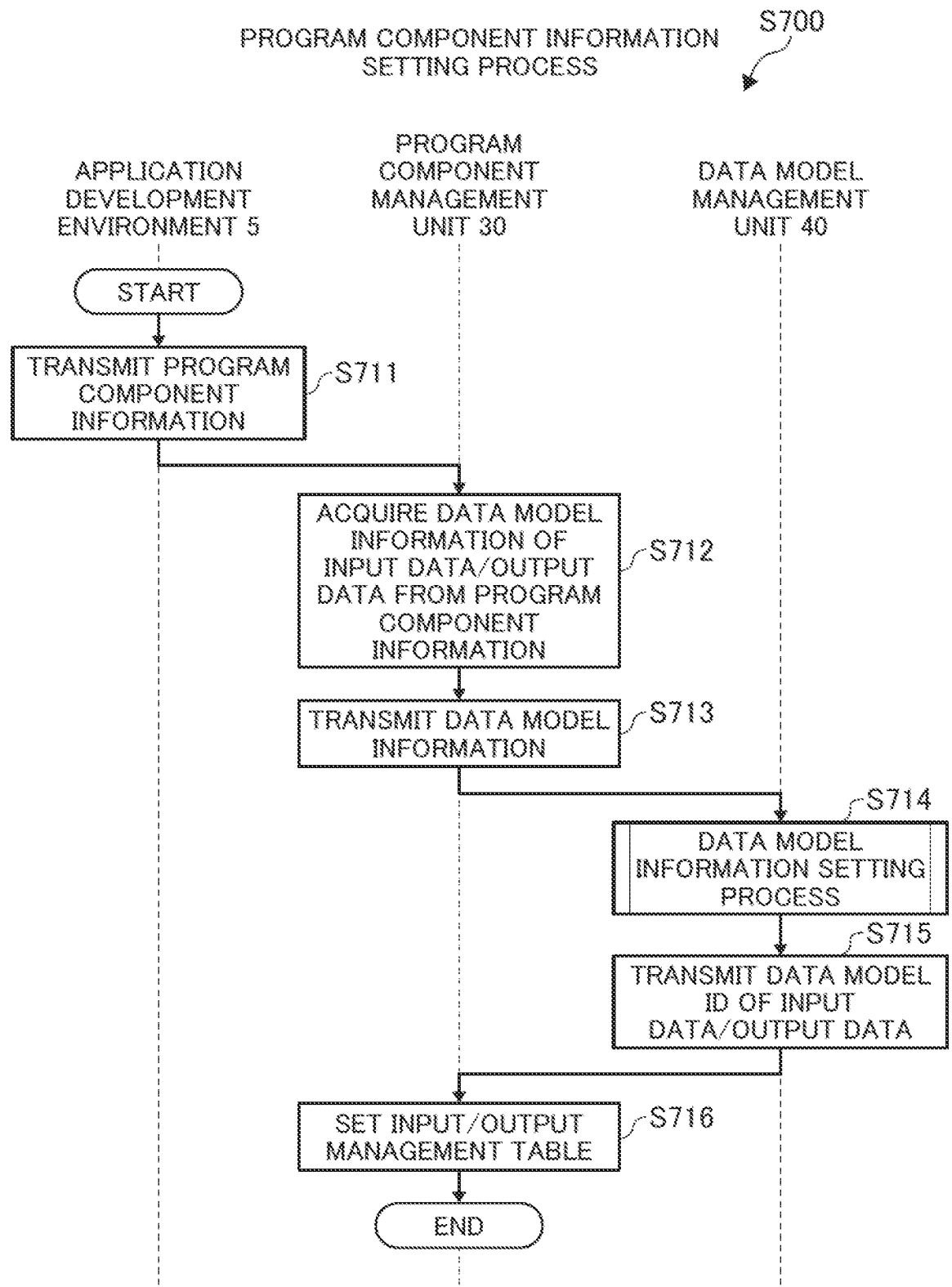

GRAPH SHOWING FREQUENCY DISTRIBUTION OF VALUE OF DATA

GRAPH SHOWING FREQUENCY DISTRIBUTION OF VALUE OF DATA

PROGRAM COMPONENT EVALUATION SYSTEM AND PROGRAM COMPONENT EVALUATION METHOD

CROSS-REFERENCE TO RELATED APPLICATION

This application claims priority pursuant to Japanese patent application No. 2020-078943, filed on Apr. 28, 2020, the entire disclosure of which is incorporated herein by reference.

BACKGROUND

Technical Field

The present invention relates to a program component evaluation system and a program component evaluation method.

Japanese Unexamined Patent Application Publication No. 2015-75876 describes a design support device related to graphic programming that is connected to a database storing connection history information between modules showing processing and connects the modules to create a data flow for programming. The design support device extracts attribute information of a selected module to present connection candidates for the module, and extracts a combination of the selected module and another module in the data flow that satisfy predetermined conditions based on the extracted attribute information and the connection history information between the modules stored in the database. The attribute information includes information of a category given to the module, and the design support device uses the information of the category to extract the combination of the selected module and another module. In addition, the attribute information includes information (data type) of input/output terminals provided in the module, and the design support device uses the information of the input/output terminals to extract the combination of the selected module and another module.

The design support device described in Japanese Unexamined Patent Application Publication No. 2015-75876 uses a category and an input/output data type as attributes of the module, and presents connection candidates by using the number of times of connection to the input/output terminals of each module as a connection history.

However, in the case where the module (hereinafter, also referred to as "program component") is operated on the assumption that not only the data type but also the contents of the data satisfy predetermined conditions, even if the program component can be connected, there is a possibility that the program component is not operated so as to exhibit the anticipated functions or effects.

SUMMARY

The present invention has been made in view of such a background, and the object thereof is to provide a program component evaluation system and a program component evaluation method capable of appropriately evaluating a program component.

According to one aspect of the present invention for achieving the above-described object, provided is a program component evaluation system implemented by an information processing device. The program component evaluation system is configured to store a data model that is information including a data type and data characteristics required for each input data of plural program components used for configuring software, extract the data model conforming to the data type of target input data that is data to be determined regarding whether or not the data can be used as the input data of the program component, analyze whether or not the target input data conforms to each of the data characteristics for each of the extracted data models, specify the program component in which the target input data conforms to the data characteristics of the data model of the input data, and output information indicating the specified program component.

Other problems disclosed in the application and the solution method thereof will be clarified by the columns of embodiments and the drawings.

According to the present invention, it is possible to appropriately evaluate a program component.

BRIEF DESCRIPTION OF THE DRAWINGS

FIG. 4 shows an example of a data model management table;

FIG. 5 shows an example of an operation log table;

FIG. 6 shows an example of an analysis result table;

FIG. 7 is a sequence diagram for describing a program component information setting process;

DESCRIPTION OF EMBODIMENTS

Figure 1:
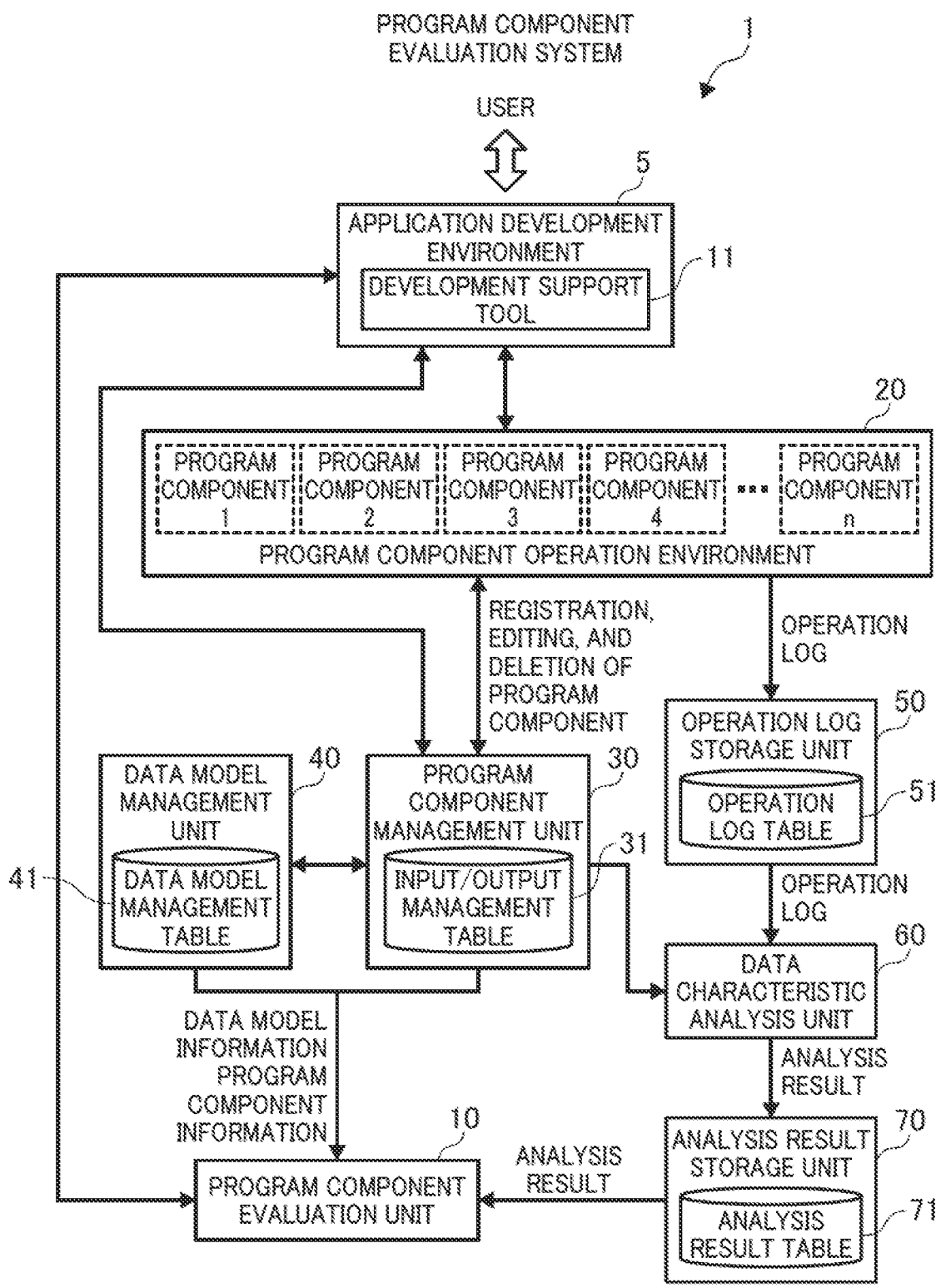
FIG. 1 is a diagram for describing schematic functions of a program component evaluation system.

Hereinafter, embodiments will be described with reference to the drawings. In the following description, the same or similar configurations are followed by the same reference numerals, and the duplicated description may be omitted. In addition, the following description and drawings are exemplified for describing the present invention, and are appropriately omitted and simplified to clarify the description. In addition, the present invention can be also carried out in various other forms. In addition, unless otherwise limited, each constitutional element may be singular or plural. In addition, when identification information is described, expressions such as "identifier" and "ID" are appropriately used, but these can be replaced by each other. In addition, the letter "S" added before the reference numeral means a processing step in the following description.

In addition, various kinds of information are described by expressions such as "table" and "list" in the following description in some cases, but the various kinds of information may be expressed by other data structures. In order to show not depending on data structures, "XX table", "XX list", and the like are referred to as "XX Information" in some cases.

First Embodiment

FIG. 1 is a system flow diagram for describing a schematic configuration of an information processing system (hereinafter, referred to as "program component evaluation system 1") to be described as a first embodiment. The program component evaluation system 1 supports work related to the evaluation of program components (modules) performed when developers and the like of application software (hereinafter, referred to as "application") develop an application. The program component evaluation system 1 supports work related to the evaluation of program components in terms of consistency between the program components and data (hereinafter, referred to as "input data") to be input to the program components.

As shown in the drawing, the program component evaluation system 1 includes each configuration (function) of an application development environment 5, a program component operation environment 20, a program component management unit 30, a data model management unit 40, an operation log storage unit 50, a data characteristic analysis unit 60, an analysis result storage unit 70, and a program component evaluation unit 10. These configurations are realized by using an information processing device (computer).

The application development environment 5 provides application developers with an application development environment. The above-described development environment is realized by using, for example, a development support tool 11 (for example, an integrated development environment (IDE)) that is software for supporting the development of an application in an interactive manner with the application developers. In the embodiment, as an example of the development support tool 11, a visual programming tool such as Node-RED (registered trademark) is assumed. In this case, the program component is, for example, an API (Application Program Interface) (microservices provided by WebAPI and Open-API) called from a node of Node-RED (registered trademark).

The program component operation environment 20 is an operation environment for program components called by an application developed in the application development environment 5 at the time of execution, and is, for example, an execution environment (API Server) for plural APIs provided using a cloud service or the like. The program component operation environment 20 sequentially executes the program components called by the application developed in the application development environment 5, and outputs an operation log thereof. The operation log is, for example, an API call log output by an API gateway. The operation log includes, for example, an identifier (hereinafter, referred to as "program component ID") of the executed program component, a date and time when the program component was executed, and information related to input data and output data of the program component.

The program component management unit 30 manages (registration, editing, deletion, and the like) the program components operating in the program component operation environment 20. The program component management unit 30 provides, for example, users such as application developers and system administrators with a user interface for setting information (hereinafter, referred to as "program component information") related to program components such as program component IDs and the actual conditions of program components. The program component management unit 30 stores an input/output management table 31. The details of the input/output management table 31 will be described later.

The data model management unit 40 manages information related to the data type and data characteristics of the input data and information related to the data type and data characteristics of the data (hereinafter, referred to as "output data") output from the program components in the data model management table 41. In the following description, a combination (set) of information related to the data type and information related to the data characteristics is referred to as "data model". In addition, in the following description, the identifier assigned to the data model is referred to as "data model ID". In addition, information related to the data model is referred to as "data model information".

The operation log storage unit 50 manages (stores) the operation log output from the program component operation environment 20 in the operation log table 51. The operation log storage unit 50 provides the operation log to the data characteristic analysis unit 60. The details of the operation log table 51 will be described later.

The data characteristic analysis unit 60 analyzes whether or not the input data and output data of the program components included in the operation log conform to the data characteristics of the data model, and outputs the analyzed result (hereinafter, referred to as "analysis result").

The analysis result storage unit 70 stores the analysis result output from the data characteristic analysis unit 60 in an analysis result table 71. The details of the analysis result table 71 will be described later.

The program component evaluation unit 10 generates a list of program components having consistency (consistency of the data types and data characteristics) of the input data based on the data model information, the program component information, the operation log, and the analysis result, and presents the generated list to the user.

Figures 2, 3:
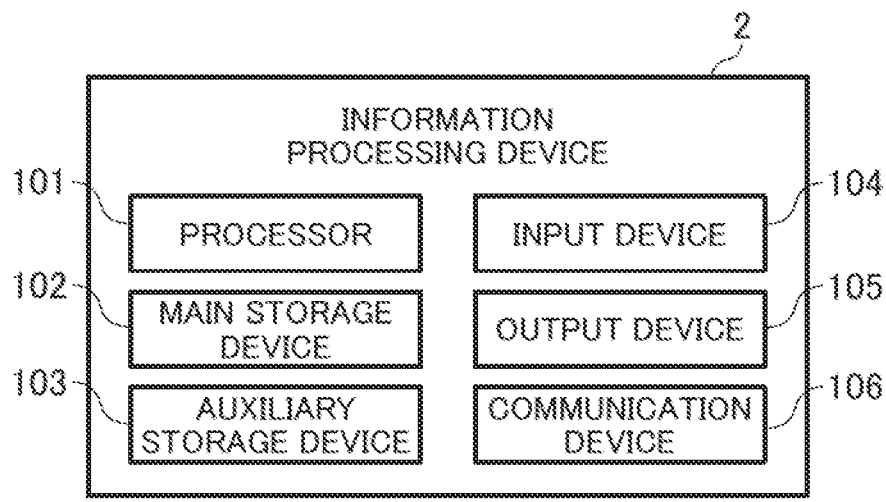
FIG. 2 shows a configuration example of an information processing device used for realizing the program component evaluation system.
FIG. 3 shows an example of an input/output management table.

FIG. 2 shows an example of a hardware configuration of an information processing device used for realizing the program component evaluation system 1. An exemplified information processing device 2 includes a processor 101, a main storage device 102, an auxiliary storage device 103, an input device 104, an output device 105, and a communication device 106. Note that all or a part of the information processing device 2 may be realized by using, for example, virtual information processing resources provided using a virtualization technology or a process space separation technology such as a virtual server provided by a cloud system. In addition, all or a part of the functions provided by the information processing device 2 may be realized by, for example, services provided by a cloud system via an API (Application Programming Interface) or the like. In addition, the program component evaluation system 1 may be configured using plural information processing devices 2 that are communicatively connected.

In the drawing, the processor 101 is configured using, for example, a CPU (Central Processing Unit), an MPU (Micro Processing Unit), a GPU (Graphics Processing Unit), an FPGA (Field Programmable Gate Array), an ASIC (Application Specific Integrated Circuit), an AI (Artificial Intelligence) chip, or the like.

The main storage device 102 is a device for storing programs and data, and is, for example, a ROM (Read Only Memory), a RAM (Random Access Memory), a nonvolatile memory (NVRAM (Non Volatile RAM)), or the like.

The auxiliary storage device 103 is, for example, a reading/writing device of a recording medium such as a hard disk drive, an SSD (Solid State Drive), an optical storage device (CD (Compact Disc), DVD (Digital Versatile Disc), or the like), a storage system, an IC card, an SD card, or an optical recording medium, a storage area of a cloud server, or the like. Programs and data can be read into the auxiliary storage device 103 via a reading device of a recording medium or the communication device 106. Programs and data stored (memorized) in the auxiliary storage device 103 are read into the main storage device 102 as needed.

The input device 104 is an interface for accepting an input from the outside, and is, for example, a keyboard, a mouse, a touch panel, a card reader, a pen input-type tablet, an audio input device, or the like.

The output device 105 is an interface for outputting various kinds of information such as processing progress and processing results. The output device 105 is, for example, a display device (a liquid crystal monitor, an LCD (Liquid Crystal Display), a graphic card, or the like) for visualizing the above-described various types of information, a device (an audio output device (speaker or the like)) for converting the above-described various types of information into audio, and a device (a printing device or the like) for converting the above-described various types of information into characters. Note that, for example, the information processing device 2 may be configured to input or output information to/from another device via the communication device 106.

Note that the input device 104 and the output device 105 configure user interfaces for accepting information and presenting information from/to the user.

The communication device 106 is a device for realizing communications with another device. The communication device 106 is a wired or wireless communication interface for realizing communications with another device via a communication network (the Internet, a LAN (Local Area Network), a WAN (Wide Area Network), a leased line, a public communication network, or the like), and is, for example, a NIC (Network Interface Card), a wireless communication module, a USB module, or the like.

The information processing device 2 may introduce, for example, an operating system, a file system, a DBMS (DataBase Management System) (a relational database, NoSQL, or the like), a KVS (Key-Value Store), or the like.

Each of the above-described functions of the program component evaluation system 1 is realized by the processor 101 reading and executing programs stored in the main storage device 102, or by hardware (an FPGA, an ASIC, an AI chips, or the like) configuring these devices. The program component evaluation system 1 stores various kinds of information (data) as, for example, a table of a database or a file managed by a file system.

FIG. 3 shows an example of the input/output management table 31. The input/output management table 31 manages the correspondence (relationship) between the data model (hereinafter, referred to as "input data model") of the input data and the data model (hereinafter, referred to as "output data model") of the output data of each program component in the program component operation environment 20. The contents of the input/output management table 31 are set by, for example, the user.

As shown in the drawing, the input/output management table 31 includes plural entries (records) having items of a program component ID 311, an input data model ID 312, and an output data model ID 313. The program component ID is set to the program component ID 311. The data model ID of the input data model of the program component is set to the input data model ID 312. The data model ID of the output data model of the program component is set to the output data model ID 313.

FIG. 4 shows an example of the data model management table 41 shown in FIG. 1. The data model management table 41 manages the contents (the data type and data characteristics) of the data model. The contents of the data model management table 41 are set by, for example, the user. In addition, the contents of the data model management table 41 may be set using, for example, information obtained by being automatically extracted from information such as the source codes of the program components.

As shown in the drawing, the data model management table includes plural entries (records) having items of a data model ID 411, a data type 412, and a data characteristic 413. The data model ID is set to the data model ID 411. The data type of the data model is set to the data type 412. The data characteristics of the data model are set to the data characteristic 413. Note that the data characteristics are, for example, information indicating the possible range (the upper limit or the lower limit) of data handled in the data model, the tendency of the data (distribution, the pattern of dispersion, or the like), whether the data is a continuous value or a discrete value, whether the data is a unique value (specific parameter), and the like. The data characteristics are set by, for example, the developers of the program components when designing the program components.

Note that the data characteristics and the actual functions of the program components do not necessarily match each other. For example, even when the value of data deviates from the data characteristics, the program component can normally function in some cases.

FIG. 5 shows an example of the operation log table 51 shown in FIG. 1. The operation log table 51 manages operation logs that are log information output from the program component operation environment 20 at the time of executing the program components.

As shown in the drawing, the operation log table 51 is configured by one or more entries (records) having items of a log ID 511, a date and time 512, a program component ID 513, input data 514, and output data 515. The log ID that is an identifier assigned to each management unit of the operation log is set to the log ID 511. The date and time when the operation log was generated is set to the date and time 512. The program component ID of the program component targeted by the operation log is set to the program component ID 513. The contents (including the data model ID of the input data model) of the input data of the program component are set to the input data 514. The contents (including the data model ID of the output data model) of the output data of the program component are set to the output data 515.

FIG. 6 shows an example of the analysis result table 71 shown in FIG. 1. The analysis result table 71 manages results (hereinafter, referred to as "analysis results") obtained by comparing (analyzing) the contents of the operation log with the data characteristics of the data model.

As shown in the drawing, the analysis result table 71 is configured by one or more entries (records) having items of a date and time 711, a log ID 712, a data model ID 713, and a analysis result 714. The date and time of generation of the operation log used for the analysis is set to the date and time 711. The log ID of the operation log is set to the log ID 712. The data model ID is set to the data model ID 713. The analysis contents and analysis result are recorded in the analysis result 714. In the case of the exemplified analysis result table 71, if the data characteristics of the data model are satisfied as the analysis result, "PASS" is recorded, and otherwise, "FAIL" is recorded. For example, the analysis result 714 corresponding to "2019/2/27 13:00:00" of the date and time 711, "001" of the log ID 712, and "DM3" of the data model ID 713 in the exemplified analysis result table 71 records information of "PASS" because the number of characters was 16 for the condition that the number of characters of the data characteristic is 256 or less.

Next, processes performed in the program component evaluation system 1 will be described.

FIG. 7 is a sequence diagram for describing a process (hereinafter, referred to as "program component information setting process S700") in which the program component evaluation system 1 sets the contents of the input/output management table 31 and the data model management table 41 based on information accepted from the user. Hereinafter, the program component information setting process S700 will be described with reference to FIG. 7.

First, the application development environment 5 transmits program component information accepted from the user to the program component management unit 30 (S711). Note that the program component management unit 30 may be configured to directly accept the program component information from the user without interposing the application development environment 5.

When receiving the program component information from the application development environment 5, the program component management unit 30 acquires the data model information of the input data model and the data model information of the output data model from the received program component information (S712), and transmits each acquired data model information to the data model management unit 40 (S713).

When receiving the data model information from the program component management unit 30, the data model management unit 40 performs a process (hereinafter, referred to as "data model information setting process S714") related to setting of the received data model information.

Figure 8:
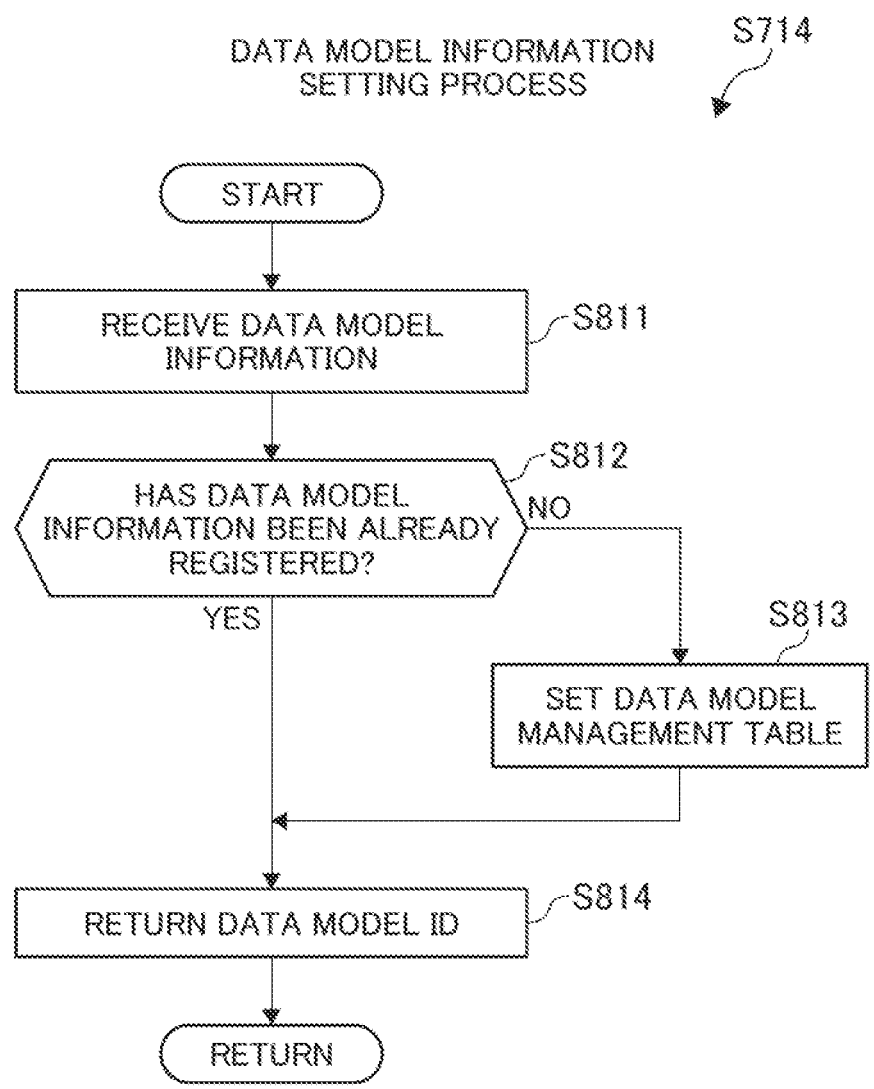
FIG. 8 is a flowchart for describing a data model information setting process.

FIG. 8 is a flowchart for describing the data model information setting process S714. Hereinafter, the data model information setting process S714 will be described with reference to FIG. 8.

When receiving the data model information from the program component management unit 30 (S811), the data model management unit 40 determines whether or not the received data model information already exists in the data model management table (S812). If the received data model information does not exist in the data model management table 41 (S812: NO), the data model management unit 40 assigns a new data model ID to the data model in the data model information, and sets the data model information of the data model in the data model management table 41. Thereafter, the process proceeds to S814. On the other hand, if the received data model information exists in the data model management table 41 (S812: YES), the process proceeds to S814.

In S814, the data model management unit 40 sets the data model ID assigned (or already assigned) to the data model of the received data model information to the return value, and terminates the data model information setting process S714.

Referring back to FIG. 7, the data model management unit 40 transmits the content (data model ID) of the return value of the data model information setting process S714 to the program component management unit 30 in S715.

When receiving the data model ID, the program component management unit 30 sets the program component of the program component information received in S712, together with the received data model ID, in the input/output management table 31 (S716).

As described above, the contents of the input/output management table 31 and the data model management table 41 are set based on the information accepted from the user.

Figure 9:
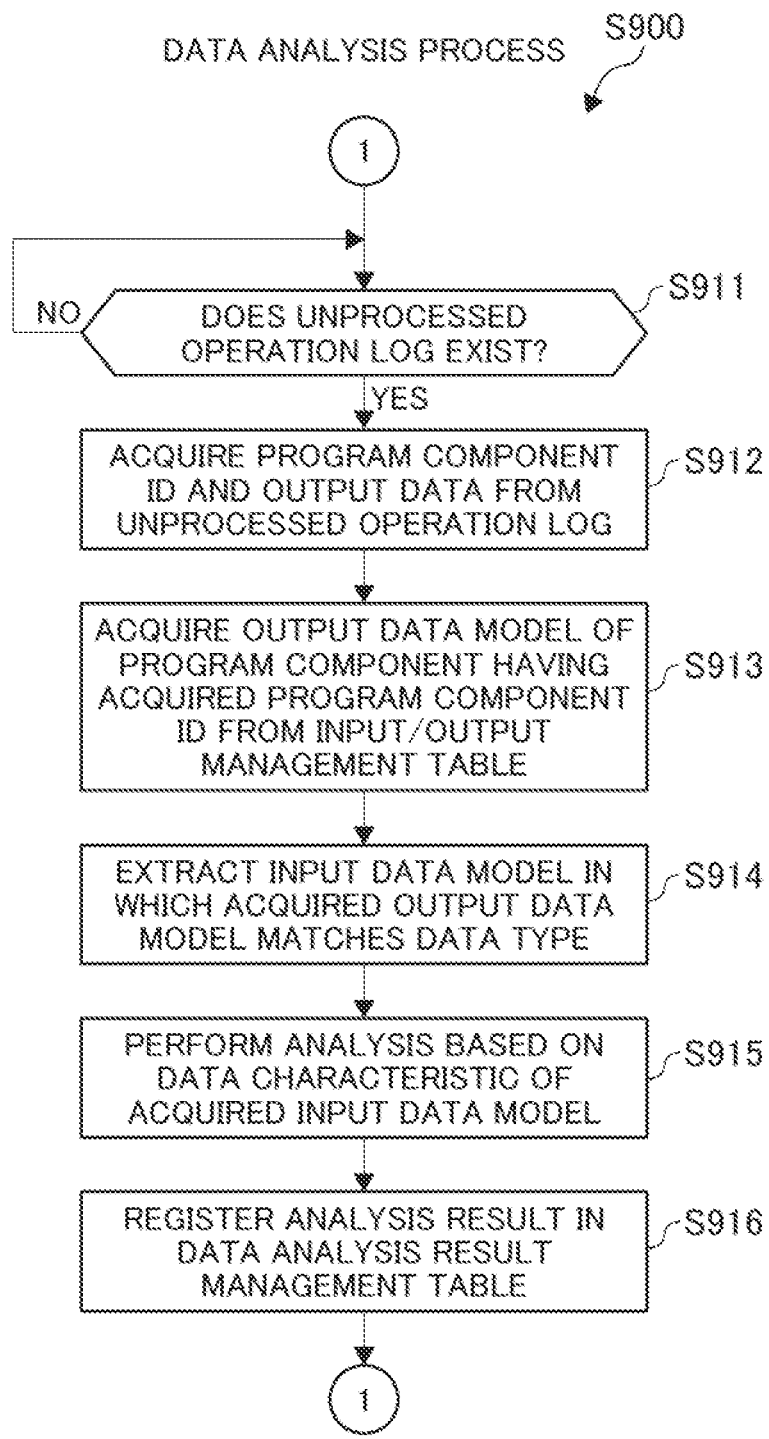
FIG. 9 is a flowchart for describing a data analysis process.

FIG. 9 is a flowchart for describing a process (hereinafter, referred to as "data analysis process S900") in which the data characteristic analysis unit 60 registers, in the analysis result table 71, an analysis result obtained by comparing (analyzing) the contents of the operation log in the operation log table 51 with the data characteristics of the data model. Hereinafter, the data analysis process S900 will be described with reference to FIG. 9.

The data characteristic analysis unit 60 repeatedly (for example, in real time) monitors whether or not an unprocessed operation log (that has not yet been a target for the process after S912) exists in the operation log table 51 (S911). When detecting the existence of the unprocessed operation log (S911: YES), the data characteristic analysis unit 60 executes the process from S912.

In S912, the data characteristic analysis unit 60 acquires information of the program component ID and the output data from the unprocessed operation log.

Next, the data characteristic analysis unit 60 acquires the data model of the output data of the program component having the acquired program component ID from the input/output management table 31 (S913).

Next, the data characteristic analysis unit 60 acquires the data model ID whose data type matches the output data model of the acquired output data among those of the input data model ID 312 in the input/output management table 31. Note that the data characteristic analysis unit 60 acquires the above-described data type from the data model management table 41 (S914).

Next, the data characteristic analysis unit 60 compares the data characteristics (data characteristics acquired from the data model management table 41) of the data model ID (data model ID of the input data model) acquired in S914 with the output data acquired in S912 to analyze whether or not the output data conforms to the data characteristics (S915).

Next, the data characteristic analysis unit 60 sets the result of the analysis (analysis result) in the analysis result table 71 (S916). Thereafter, the process returns to S911.

By the above process, the content of the input data model in the analysis result table 71 is updated to the latest state based on the information related to the output data of the operation log.

Figure 10:
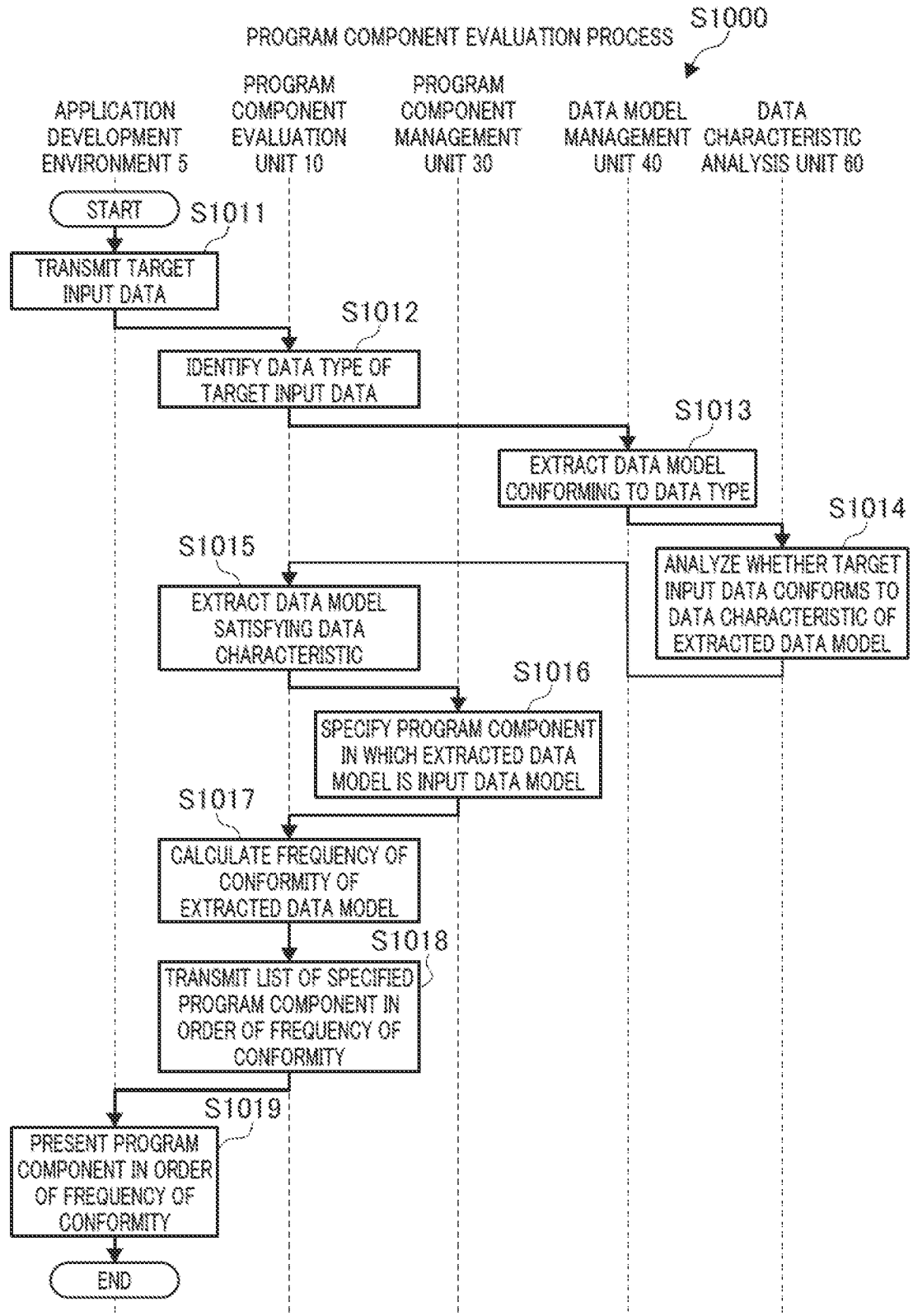
FIG. 10 is a flowchart for describing a program component evaluation process of a first embodiment.

FIG. 10 is a sequence diagram for describing a process (hereinafter, referred to as "program component evaluation process S1000") in which the program component evaluation system 1 presents a candidate of the program component matching the input data accepted from the user. The program component evaluation process S1000 is executed, for example, when the user wants to know a candidate of the program component that can be used by using predetermined input data as an input, or when the development support tool 11 intends to present a candidate of another program component that can be connected to a predetermined program component. Hereinafter, the program component evaluation process S1000 will be described with reference to FIG. 10.

First, the application development environment 5 transmits input data (hereinafter, referred to as "target input data") designated by the user to the program component evaluation unit 10 (S1011).

When receiving the target input data, the program component evaluation unit 10 identifies the data type of the received target input data, and transmits the identified data type to the data model management unit 40 (S1012).

When receiving the data type of the target input data, the data model management unit 40 extracts the data model conforming to the received data type from the data model management table 41, and transmits the extracted data model to the data characteristic analysis unit 60 (S1013).

When receiving the data model, the data characteristic analysis unit 60 analyzes whether or not the target input data received in S1012 conforms to the data characteristics of each received data model, and transmits the result (analysis result) to the program component evaluation unit 10 (S1014).

When receiving the analysis result, the program component evaluation unit 10 extracts the data model in which the target input data satisfies all the data characteristics among those extracted in S1013 based on the received analysis result, and transmits the data model to the program component management unit 30 (S1015).

The program component management unit 30 specifies the program component having the data model extracted in S1015 as the input data model from the input/output management table 31, and transmits the program component ID of the specified program component to the program component evaluation unit 10 (S1016).

Next, the program component evaluation unit 10 acquires, from the analysis result table 71, information indicating the presence or absence of conformity of the data characteristics of each data model extracted in S1015 in a predetermined period in the past, and obtains the frequency of conformity of the data characteristics of each data model in the predetermined period in the past based on the acquired information (S1017). The predetermined period is, for example, a period from a certain point in the past to the present. In addition, for example, the setting of the predetermined period may be accepted from the user.

Next, the program component evaluation unit 10 receives the program component ID of the program component specified in S1016, and transmits to the application development environment information obtained by arranging the program components having the received program component IDs in the order of the frequency of conformity (S1018).

When receiving the information, the application development environment 5 presents the received information (information obtained by arranging the program components specified in S1016 in the order of the frequency of conformity of each input data model) to the user via the user interface (S1019). Then, the program component evaluation process S1000 is completed.

According to the program component evaluation process S1000 described above, the data model (a set of the data type and the data characteristics) of the input data and the output data of the program component is managed, and the program components whose data types match the target input data and whose data characteristics conform to the target input data can be arranged in the order of the frequency of conformity to be presented to the user. Therefore, the user can easily search for an appropriate program component for which the input data can be used, and can efficiently develop the application.

Second Embodiment

The program component evaluation system 1 of the first embodiment presents the user with a candidate of the program component that can be used by using the input data designated by the user as an input. On the contrary, a program component evaluation system 1 of a second embodiment accepts inputs of input data and a program component from the user, evaluates whether or not the accepted input data conforms to the accepted program component, and outputs the result. The configuration of the program component evaluation system 1 of the second embodiment is generally common to that of the program component evaluation system 1 of the first embodiment. Hereinafter, differences from the program component evaluation system 1 of the first embodiment will be mainly described.

Figure 11:
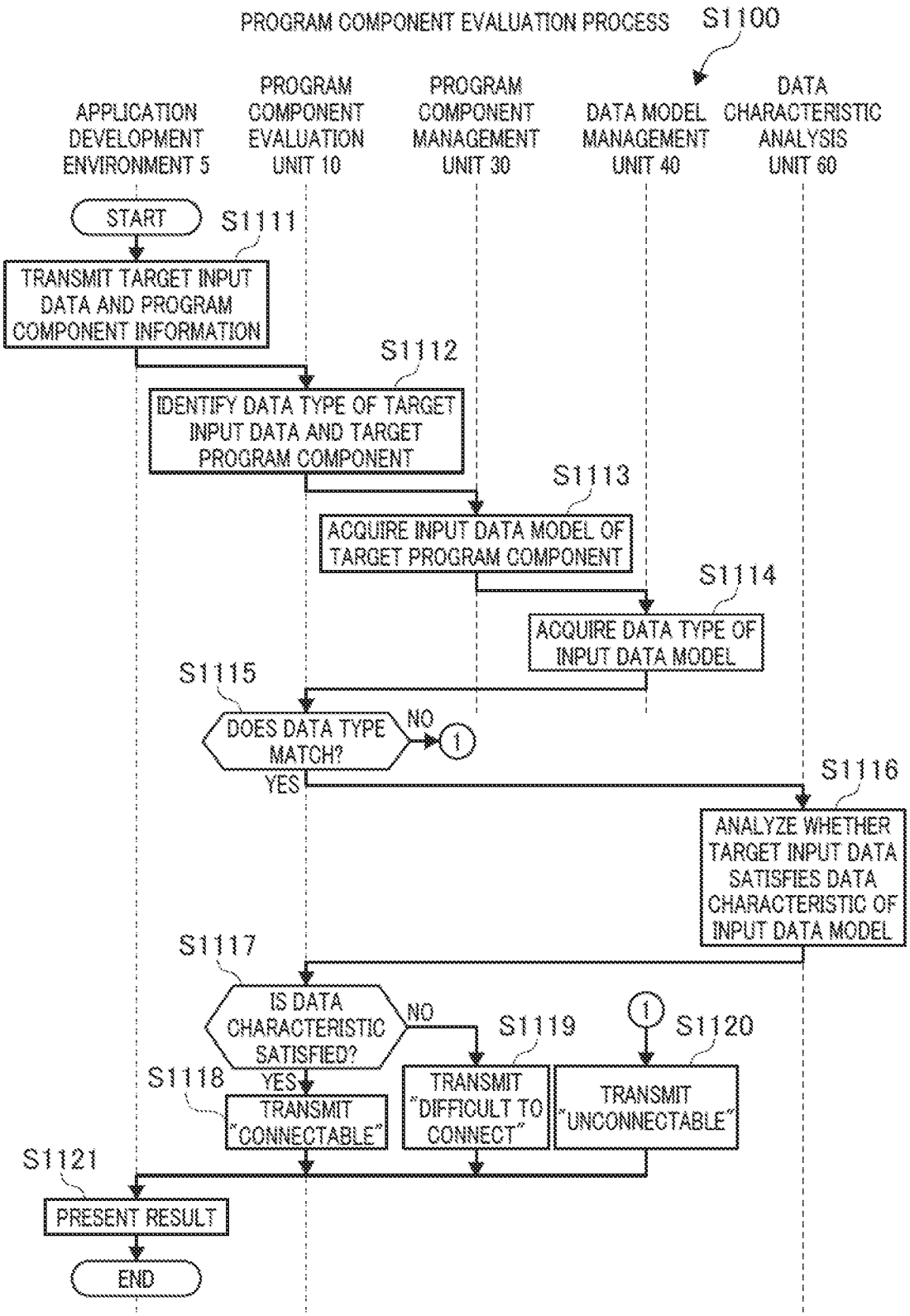
FIG. 11 is a flowchart for describing a program component evaluation process of a second embodiment.

FIG. 11 is a sequence diagram for describing a process (hereinafter, referred to as "program component evaluation process S1100") performed by the program component evaluation system 1 of the second embodiment. The program component evaluation process S1100 is executed, for example, when the user intends to evaluate whether or not predetermined input data (hereinafter, referred to as "target input data") can be used as an input to a predetermined program component (hereinafter, referred to as "target program component"). Hereinafter, the program component evaluation process S1100 will be described with reference to FIG. 11.

First, the application development environment 5 transmits the target input data and program component information of the target program component input by the user to the program component evaluation unit 10 (S1111).

When receiving the target input data and the program component information of the target program component, the program component evaluation unit 10 identifies each of the data type of the input data and the program component ID included in the program component information, and transmits the identified program component ID to the program component management unit 30 (S1112).

When receiving the program component ID, the program component management unit 30 acquires the input data model corresponding to the received program component ID, that is, the input data model of the input data of the target program component from the input/output management table 31, and transmits the same to the data model management unit 40 (S1113).

When receiving the input data model, the data model management unit 40 acquires the data type of the received input data model from the data model management table 41, and transmits the acquired data type to the program component evaluation unit 10 (S1114).

Next, the program component evaluation unit 10 compares the data type of the input data identified in S1112 with the data type of the input data model of the input data of the target program component acquired in S1114, and determines whether or not the both match each other (S1115). If the both match each other (S1115: YES), the process proceeds to S1116. If the both do not match each other (S1115: NO), the process proceeds to S1120, and the program component evaluation unit 10 transmits "unconnectable" to the application development environment 5.

In S1116, the data characteristic analysis unit 60 analyzes whether or not the target input data received in S1112 conforms to the data characteristics of the input data model of the input data of the target program component acquired in S1113, and transmits the analysis result to the program component evaluation unit 10.

In S1117, the program component evaluation unit 10 receives the analysis result, and determines the contents of the received analysis result (S1117). If the target input data conforms to the data characteristics of the input data model of the target program component (S1117: YES), the program component evaluation unit 10 transmits "connectable" to the application development environment 5 (S1118). On the other hand, if the target input data does not conform to the data characteristics of the input data model of the target program component (S1117: NO), the program component evaluation unit 10 transmits "difficult to connect" to the application development environment 5 (S1119).

The application development environment 5 receives any one of "connectable", "difficult to connect", and "unconnectable" from the program component evaluation unit 10, and presents the received content to the user (S1121).

As described above, according to the program component evaluation system 1 of the second embodiment, it is possible to accept the designation of the target input data and the target program component from the user, determine whether or not the target input data matches the target program component, and present the result to the user. Accordingly, for example, the user can easily confirm that the target program component can be used for the target input data. Therefore, for example, if a program component to be used has been decided, necessary input data can be efficiently prepared, and the application can be efficiently developed.

Third Embodiment

A program component evaluation system 1 of a third embodiment presents frequency distribution of data handled by program components to the user based on operation logs of the program components. The configuration of the program component evaluation system 1 of the third embodiment is generally common to that of the program component evaluation system 1 of the first embodiment. Hereinafter, differences from the program component evaluation system 1 of the first embodiment will be mainly described.

Figure 12:
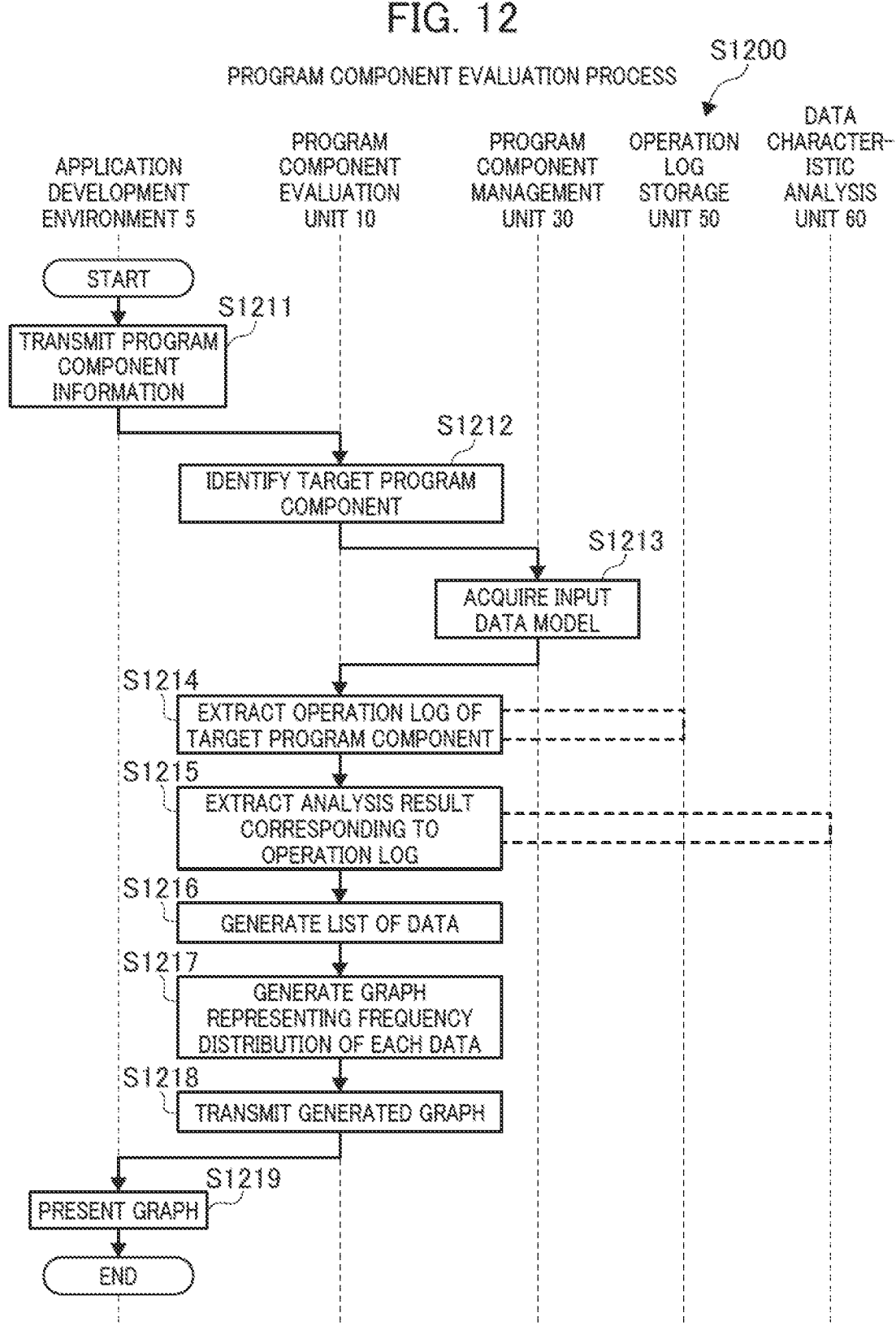
FIG. 12 is a flowchart for describing a program component evaluation process of a third embodiment.

FIG. 12 is a sequence diagram for describing a process (hereinafter, referred to as "program component evaluation process S1200") performed by the program component evaluation system 1 of the third embodiment. The program component evaluation process S1200 is executed, for example, when the user intends to evaluate data handled by a predetermined program component. Hereinafter, the program component evaluation process S1200 will be described with reference to FIG. 12.

First, the application development environment 5 transmits program component information of a predetermined program component (hereinafter, referred to as "target program component") input by the user to the program component evaluation unit 10 (S1211).

When receiving the program component information, the program component evaluation unit 10 identifies the program component ID included in the program component information, and transmits the identified program component ID to the program component management unit 30 (S1212).

When receiving the program component ID, the program component management unit 30 acquires the input data model corresponding to the received program component ID, that is, the data model ID of the input data model of the input data of the target program component, and transmits the acquired data model ID to the program component evaluation unit 10 (S1213).

Next, the program component evaluation unit 10 extracts an operation log of the target program component from the operation log table 51 based on the program component ID identified in S1212 and the data model ID of the input data model acquired in S1213 (S1214).

Next, the program component evaluation unit 10 extracts, from the analysis result table 71, the analysis result of the operation log extracted in S1214 (S1215).

Next, the program component evaluation unit 10 generates a list (information indicating data used by the target program component) of data (the mean value, variance, and the like) included in the extracted analysis result (S1216).

Next, the program component evaluation unit 10 obtains frequency distribution of the value of each data in the list generated based on the analysis result in a predetermined period in the past, and generates a graph representing the obtained frequency distribution (S1217).

Next, the program component evaluation unit 10 transmits the graph to the application development environment 5 (S1218).

When receiving the graph, the application development environment 5 presents a screen on which the received graph is described to the user (S1219).

Figure 13:
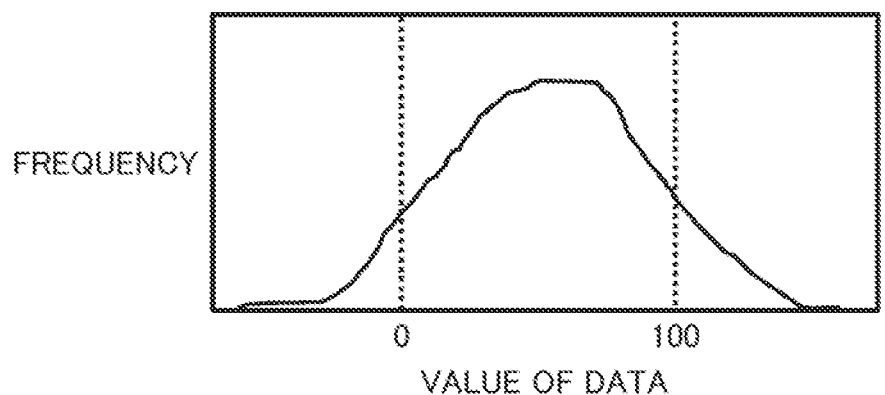
FIG. 13 shows an example of a graph showing data usage frequency distribution.

FIG. 13 shows an example of the graph. The exemplified graph shows the frequency distribution of the values of data in the data model whose data model ID is "DM8" in the data model management table 41 shown in FIG. 4. In the exemplified graph, the horizontal axis represents the value (integer value) of the data and the vertical axis represents the frequency. Note that, as shown in FIG. 4, since "range 0<value<100" is set to the data characteristic 413 of the data model, boundary lines are displayed at the positions of "0" and "100" on the horizontal axis in FIG. 13. Based on this graph, the user can easily grasp the range of the values of data handled by a predetermined program component.

Note that although the exemplified graph has a peak around the middle between "0" and "100", it can be confirmed that the data is used in the ranges of "0" or smaller and "100" or larger. That is, the user can easily grasp from the graph that the data is used in the ranges of "0" or smaller and "100" or larger for the target program component. In addition, for example, the user can efficiently propose improvement measures for the target program component and develop new utilization needs by using the information grasped from the exemplified graph.

In the meantime, although the graph representing the frequency distribution of the values of data used by the target program component is generated by the user and presented to the user as described above, a similar graph may be generated for the same data used by another program component other than the target program component and presented to the user together with the above-described graph.

Figure 14:
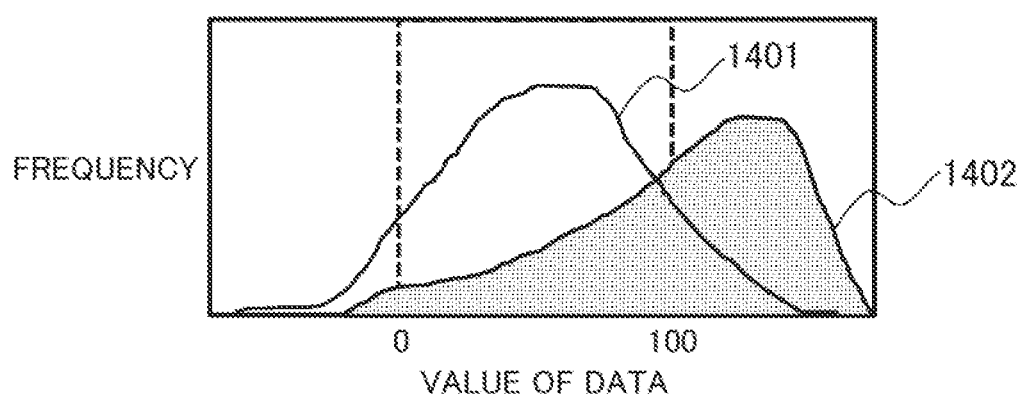
FIG. 14 shows an example of a graph showing data usage frequency distribution.

FIG. 14 shows an example of the graph in this case. In FIG. 14, a graph indicated by the reference numeral 1401 is a graph generated for the target program component, and a graph indicated by the reference numeral 1402 is a graph generated for the same data used by a program component other than the target program component. Based on these graphs, the user can grasp that there are utilization needs in the ranges of "0" or smaller and "100" or larger for the target program component.

Although various embodiments have been described above, the present invention is not limited to the above-described embodiments, and includes various modified examples. In addition, the configurations of the above-described embodiments have been described in detail to easily understand the present invention, and the present invention is not necessarily limited to those including all the configurations described above. In addition, some configurations of each embodiment can be added to, deleted from, and replaced by other configurations.

For example, a case in which the program component is a program component to which input data of one data model is input and from which output data of one data model is output has been described above as an example, but the program component may be a program component to which plural input data of different data models are input, or a program component from which plural output data of different data models are output. In this case, the same process as described above may be performed for each data model.

In addition, the above-described configurations, functions, processing units, processing means, and the like may be realized using hardware by, for example, designing some or all thereof with integrated circuits. In addition, the above-described configurations, functions, processing units, processing means, and the like can be also realized by program codes of software that realizes each function shown in the embodiments. In this case, a storage medium in which a program code is recorded is provided to an information processing device (computer), and a processor provided in the information processing device reads the program code stored in the storage medium. In this case, the program code itself read from the storage medium realizes the functions of the above-described embodiments, and the program code itself and the storage medium storing the program code configure the present invention. As a storage medium for supplying such a program code, for example, a hard disk, an SSD (Solid State Drive), an optical disk, a magneto-optical disk, a CD-R, a flexible disk, a CD-ROM, a DVD-ROM, a magnetic tape, a nonvolatile memory card, a ROM, or the like is used.

The control lines and the information lines considered to be necessary in the explanation are shown in the above-described embodiments, and all the control lines and the information lines in a product are not necessarily shown. All the configurations may be connected to each other. In addition, although various kinds of information are exemplified above in a table format, these kinds of information may be managed in a format other than a table.

What is claimed is:

1. A program component evaluation system implemented by an information processing device, comprising:
    a memory storing a program for execution by the information processing device; and
    a processor programmed to execute the program, which when executed causes the processor to:
    store a data model that is information including a data type and data characteristics required for each input data of plural program components used for configuring software,
    extract the data model conforming to the data type of target input data that is data to be determined regarding whether or not the data can be used as the input data of the program component,
    analyze whether or not the target input data conforms to each of the data characteristics for the data model,
    specify the program component in which the target input data conforms to the data characteristics of the data model of the input data,
    output information indicating the specified program component,
    store an operation log of the program component,
    store information that is acquired by comparing the operation log with the data characteristics of the data model and indicates the presence or absence of conformity of the data characteristics of the data model,
    obtain the frequency of conformity of the data characteristics in a predetermined period in the past, for each of the data models extracted as conforming to the data type of the target input data, and
    arrange to output information indicating the specified program component in the order of the frequency of conformity of each data model of the specified program component.

2. The program component evaluation system according to claim 1,
    wherein the software is configured by coupling the plural program components to each other, and
    wherein the target input data is output data of one program component of two program components to be coupled to each other, and the specified program component is the other program component of the two program components to be coupled to each other.

3. The program component evaluation system according to claim 1,
    the system configured
    acquire the frequency distribution of the values of data used by the program component in a predetermined period in the past by analyzing the operation log, and
    output information indicating the acquired frequency distribution.

4. The program component evaluation system according to claim 3,
    the system configured to output a graph showing the frequency distribution for each value of the data.

5. The program component evaluation system according to claim 1,
    the system configured to
    acquire the frequency distribution of the values of the same data used by each of the program components in a predetermined period in the past by analyzing the operation log of each of the plural program components, and
    output information indicating the frequency distribution acquired for each of the program components.

6. The program component evaluation system according to claim 5,
    the system configured to output a graph showing the frequency distribution for each value of the data of each of the plural program components.

7. A program component evaluation system implemented by an information processing device, comprising:
    a memory storing a program for execution by the information processing device; and
    a processor programmed to execute the program, which when executed causes the processor to:
    store a data model that is information including a data type and data characteristics required for input data of a program component used for configuring software,
    determine whether or not the data type of target input data that is data to be determined regarding whether or not the data can be used as the input data of the program component conforms to the data model of the program component,
    analyze, when the data type of the target input data conforms to the data model of the program component, whether or not the target input data conforms to the data characteristics of the data model, output the result of the analysis, output, when the data type of the target input data does not conform to the data model of the program component, information indicating that the target input data cannot be used as the input data of the program component as the result of the analysis, output, when the data type of the target input data conforms to the data model of the program component but the target input data does not conform to the data characteristics of the data model, information indicating that it is difficult to use the target input data as the input data of the program component as the result of the analysis, and output, when the data type of the target input data conforms to the data model of the program component and the target input data conforms to the data characteristics of the data model, information indicating that the target input data can be used as the input data of the program component as the result of the analysis.

8. A program component evaluation method implemented by an information processing device comprising:

storing a data model that is information including a data type and data characteristics required for each input data of plural program components used for configuring software;

extracting the data model conforming to the data type of target input data that is data to be determined regarding whether or not the data can be used as the input data of the program component;

analyzing whether or not the target input data conforms to each of the data characteristics for the data model;

specifying the program component in which the target input data conforms to the data characteristics of the data model of the input data;

outputting information indicating the specified program component;

storing an operation log of the program component storing information that is acquired by comparing the operation log with the data characteristics of the data model and indicates the presence or absence of conformity of the data characteristics of the data model;

obtaining the frequency of conformity of the data characteristics in a predetermined period in the past for each of the data models extracted as conforming to the data type of the target input data; and arranging and outputting information indicating the specified program component in the order of the frequency of conformity of each data model of the specified program component.

9. The program component evaluation method according to claim 8, wherein the software is configured by coupling the plural program components to each other, and wherein the target input data is output data of one program component of two program components to be coupled to each other, and the specified program component is the other program component of the two program components to be coupled to each other.

10. The program component evaluation method according to claim 8, comprising:

acquiring the frequency distribution of the values of data used by the program component in a predetermined period in the past by analyzing the operation log; and outputting information indicating the acquired frequency distribution.

11. The program component evaluation method according to claim 10, comprising:

outputting a graph showing the frequency distribution for each value of the data.

12. The program component evaluation method according to claim 8, comprising:

acquiring the frequency distribution of the values of the same data used by each of the program components in a predetermined period in the past by analyzing the operation log of each of the plural program components; and outputting information indicating the frequency distribution acquired for each of the program components.

13. The program component evaluation method according to claim 12, comprising:

outputting a graph showing the frequency distribution for each value of the data of each of the plural program components.

\* \* \* \* \*